United States Patent [19]

Hillis

[11] Patent Number: 5,686,889
[45] Date of Patent: Nov. 11, 1997

[54] INFRARED SNIPER DETECTION ENHANCEMENT

[75] Inventor: David B. Hillis, Kensington, Md.

[73] Assignee: The United States of America as represented by the Secretary of The Army, Washington, D.C.

[21] Appl. No.: 668,607

[22] Filed: May 20, 1996

[51] Int. Cl.⁶ .................................................. G08B 21/00
[52] U.S. Cl. .................. 340/540; 250/330; 250/339.05; 250/339.14; 250/342; 340/600
[58] Field of Search ...................... 340/540, 600; 250/330, 339.05, 339.14, 339.15, 342, 395

[56] References Cited

U.S. PATENT DOCUMENTS

| | | | |
|---|---|---|---|
| 3,936,822 | 2/1976 | Hischberg | 340/540 |
| 4,780,719 | 10/1988 | Frei et al. | 342/53 |
| 4,917,490 | 4/1990 | Schaffer, Jr. et al. | 250/342 |
| 5,196,689 | 3/1993 | Sugita et al. | 250/206.1 |
| 5,246,868 | 9/1993 | Busch et al. | 436/101 |
| 5,473,162 | 12/1995 | Busch et al. | 250/341.6 |
| 5,612,676 | 3/1997 | Plimpton et al. | 250/339.15 |

*Primary Examiner*—Glen Swann
*Attorney, Agent, or Firm*—Freda L. Krosnick; William E. Eshelman

[57] ABSTRACT

Firing of small arms results in a muzzle flash that produces a distinctive signature conducive to automated or machine-aided detection with an IR (infrared) imager. The muzzle flash is intense and abrupt in the 3 to 5 μm band. A sniper detection system operating in the 3 to 5 μm region must deal with the potential problem of false alarms from solar clutter. The invention reduces the false alarm rate of an IR based muzzle flash or bullet tracking system (during day time) by adding a visible light (standard video) camera. The standard video camera helps detect (and then discount) potential sources of false alarm caused by solar clutter. If a flash is detected in both the IR and the visible spectrum at the same time, then the flash is most probably the result of solar clutter from a moving object. If a flash is detected only in the IR, then it is most probably a true weapon firing event.

18 Claims, 1 Drawing Sheet

INFRARED SNIPER DETECTION ENHANCEMENT

BACKGROUND OF THE INVENTION

The present invention relates in general to infrared detection and tracking of small arms fire and, in particular, to minimizing false alarms in such detection and tracking systems.

Infrared (IR) sensors can be used both to detect the muzzle flash from small arms fire and to track the path of the bullet. The muzzle flash from small (or large) weapons fire is detectable in the midrange IR (3–5 micron) using imaging sensors. The IR signature of a weapon firing can be characterized as a short (a few milliseconds duration) intense flash. Simple image processing techniques, for example, frame to frame subtraction, can be employed to detect this flash while ignoring most of the background.

The most difficult events to discriminate from actual weapons fire typically arise from glint. Glint occurs when moving objects reflect solar radiation, which impinges on the midrange IR band. This is also known as "solar clutter". Of course, this phenomenon only occurs during daylight hours. Most of the potential sources of false alarm result from solar clutter.

SUMMARY OF THE INVENTION

It is an object of the present invention to minimize false alarms in an infrared detection and tracking system.

This and other objects of the invention are achieved by a method for reducing the false alarm rate of an infrared detection system comprising detecting infrared radiation in a first field of view and producing a first signal indicative thereof; detecting humanly visible light in a second field of view and producing a second signal indicative thereof; comparing the first signal to the second signal; and declaring a positive detection, if the first signal is large compared to the second signal.

Preferably,the step of detecting infrared radiation includes detecting infrared radiation in the 3 to 5 micron range.

Advantageously, the step of declaring includes declaring a positive detection, if the first signal is greater than three times as large as the second signal.

The invention also encompasses an apparatus for reducing the false alarm rate of an infrared detection system comprising an infrared detector for producing a first signal; a humanly visible light detector for producing a second signal; means for comparing the first signal to the second signal;and means for declaring a positive detection, if the first signal is large compared to the second signal.

In another aspect, the invention includes an apparatus for reducing the false alarm rate of an infrared detection system comprising an infrared detector for producing a first signal; a humanly visible light detector for producing a second signal and a host computer which includes a video processing card connected to the infrared detector and the humanly visible light detector, for comparing the first signal to the second signal and for declaring a positive detection, if the first signal is large compared to the second signal.

Further objects, features and advantages of the invention will become apparent from the following detailed description taken in conjunction with the accompanying figures.

BRIEF DESCRIPTION OF THE DRAWING

The FIGURE is a schematic representation of an embodiment of the invention.

DETAILED DESCRIPTION OF THE PREFERRED EMBODIMENTS

Figure 1:
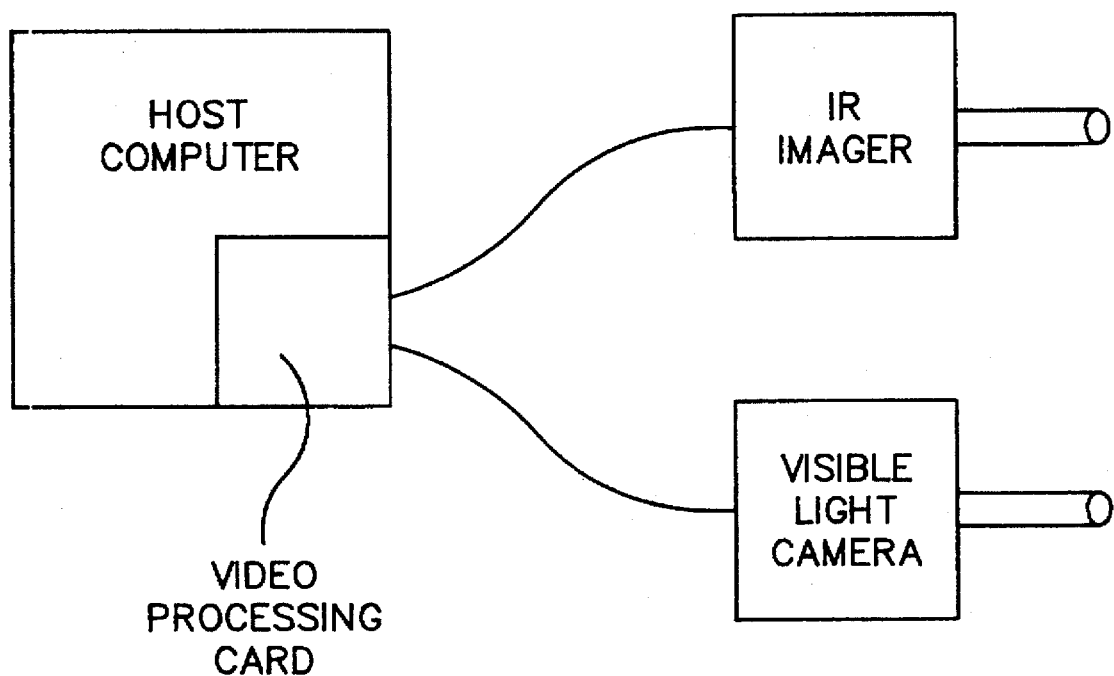

The spectral characteristics of small arms fire are well known. The interior ballistics of large and small arms have long been studied, both for improved performance and for signature reduction. Muzzle flash consists of three distinct events. The "primary flash" occurs as hot, highly compressed gases (unburned propellants) escape with the projectile. These gases expand rapidly (not mixing with the atmosphere), then rebound, creating a high-pressure, high-temperature region that produces the "intermediate flash." As oxygen mixes with the unburned propellants, ignition occurs, producing the "secondary flash."

Most of the radiated energy associated with muzzle flash occurs during the secondary flash, and most of the total radiated energy is in the IR region. There is substantially more energy in the 3 to 5 μm interval than in the 8 to 12 micron interval. The flash has strong spectral lines, particularly from H2O and CO2, at around 2.8 μm, and from CO2 at about 4.5 μm. The duration of the muzzle blast varies with weapon type from 1 or 2 ms to tens of milliseconds. The distinguishing characteristic of muzzle flash in the 3 to 5 μm range is a brief, intense flash with a strong spectral line around 4.5 μm.

Under sunny skies, the glint from vehicles, moving metal objects such as watches and clipboards, windblown vegetation and insects has produced intense flashes that were virtually indistinguishable from actual muzzle flashes. As the range to the muzzle flash or tracked bullet increases, and the pixel resolution on the flash or bullet decreases, the potential for confusion from these solar clutter sources becomes greater.

During the day, the relatively small visible signal from small arms muzzle flash is nearly impossible to detect because it is overwhelmed by sunlight. Moreover, the same glint-producing objects that reflect the 3–5 micron component of sunlight into the IR imager will also tend to reflect the visible component of sunlight at the same angle. That is, sunlight reflecting from a moving object which produces a brief flash in the IR, similar to the signature of a muzzle flash or a moving bullet, will also tend to produce a brief flash detectable in the visible region. Therefore, a visible light camera placed close to the IR imager will, in general, detect reflected sunlight from the same objects in the scene and at the same time as the IR imager.

The present invention is an apparatus and method for reducing the false alarm rate of an IR based muzzle flash or bullet tracking system. The invention augments a conventional IR based sniper detection system (during day time) by adding a humanly visible light (standard video) camera. The purpose of the standard video camera is not to help detect the muzzle flash, but to help detect (and then discount) potential sources of false alarm caused by solar clutter. If a flash is detected in both the IR and the visible spectrum at the same time, then the flash is most probably the result of solar clutter from a moving object. If a flash is detected only in the IR, then it is most probably a true weapon firing event.

The present invention can also be used to reduce false alarms for a system which uses a midrange IR sensor for bullet (or mortar, or other projectile) detection and tracking. Assuming the bullet is not a tracer round, then it will not be expected to be detectable using a visible light sensor.

The inventive sniper detection system may operate under one or more of three conditions. The first, and simplest condition, is the case where the imager is completely stationary during the weapon firing. The other two cases are those where the imager operates from a moving vehicle or is carried by a soldier. Using an IR imager has the advantages of very high angular resolution and the ability to show the operator a picture of the muzzle flash against the background. High angular resolution is needed, for example, to indicate from which particular window in a building a shot was fired. Showing the muzzle flash against the background lets the operator use his natural pattern recognition ability and provides information in a more intuitive manner than a string of coordinates does.

With practice, an observer having good eyesight and using the present invention can detect a muzzle flash even at ranges where it is reduced to one or two pixels. However, the observer must know where in the image to look and must pay close attention, without blinking. To automate the detection task, simple frame-to-frame differencing algorithms (or variations thereof) are a natural choice, because they are simple to implement in real time and reject low temporal frequency clutter. It is more complicated to extend these algorithms to a moving platform, and some high-frequency noise and clutter may be present. As the number of pixels on the target (the muzzle flash) increases, it becomes much easier for an observer to distinguish muzzle flash from potential sources of false alarm. This is in part the result of increased shape information at higher resolution and in part because a clearer view enables the use of context in the scene.

In one preferred embodiment, shown in the FIGURE, a 3-5 Micron IR imager (for example, a Mitsubishi 5120C) and a standard visible light camera (for example a Sony model XC-77 CCD video camera) are mounted together such that the camera's field of view includes all of the IR imager's field of view. The imager and camera are either physically boresighted or the pixel to pixel correspondence from the one to the other is known. The video output of both sensors (camera and imager) is input to a video processing card (for example, a Sharp GPB-1 card) which resides in a host computer. The IR and the visible light video are processed using temporal and/or spatial filtering to detect intense, brief signals like those from muzzle flash. The system compares the filtered response from both sensors. Before a positive detection is declared, the filtered response from the IR video must be large relative to any response (in the corresponding pixels) from the visible light video.

In the preferred embodiment described above, good results were obtained by requiring the ratio between the magnitudes of the processed IR and visible light signals to be greater than three before an alarm is declared. In practice, the exact ratio chosen will be based on a trade-off between desired probability of detection versus probability of false alarm and will be adjusted (either manually or automatically) to adapt to changing environmental conditions. Thus, the system can have a reduced false alarm rate without significantly reducing the probability of detection.

While the invention has been described with reference to certain preferred embodiments, numerous alterations, changes and modifications to the described embodiments are possible without departing from the spirit and scope of the invention, as set forth in the appended claims and equivalents thereof.

What is claimed is:

1. A method for reducing the false alarm rate of an infrared detection system comprising:

detecting infrared radiation in a first field of view and producing a first signal indicative thereof;

detecting humanly visible light in a second field of view and producing a second signal indicative thereof;

comparing the first signal to the second signal;and declaring a positive detection, if the first signal is large compared to the second signal.

2. The method of claim 1, wherein the step of detecting infrared radiation includes detecting infrared radiation in the 3 to 5 micron range.

3. The method of claim 2, wherein the first and second signals include video signals and further comprising filtering the signals at least one of temporally and spatially.

4. The method of claim 3, wherein the second field of view includes the first field of view.

5. The method of claim 1, further comprising the step of physically boresighting an infrared detector and a humanly visible light detector.

6. The method of claim 1, further comprising the step of establishing a pixel to pixel correspondence between an infrared detector and a humanly visible light detector.

7. The method of claim 1, wherein the step of declaring includes declaring a positive detection, if the first signal is greater than three times as large as the second signal.

8. An apparatus for reducing the false alarm rate of an infrared detection system comprising:

an infrared detector for producing a first signal;

a humanly visible light detector for producing a second signal;

means for comparing the first signal to the second signal;and means for declaring a positive detection, if the first signal is large compared to the second signal.

9. The apparatus of claim 8, wherein the infrared detector and the humanly visible light detector are physically boresighted.

10. The apparatus of claim 8, further comprising means for establishing a pixel to pixel correspondence between the infrared detector and the humanly visible light detector.

11. The apparatus of claim 8, wherein the infrared detector comprises an infrared imager and the humanly visible light detector comprises a humanly visible light camera.

12. The apparatus of claim 11, wherein the means for comparing and the means for declaring a positive detection comprise a computer.

13. The apparatus of claim 8, wherein the means for declaring includes means for declaring a positive detection, if the first signal is greater than three times as large as the second signal.

14. An apparatus for reducing the false alarm rate of an infrared detection system comprising:

an infrared detector for producing a first signal;

a humanly visible light detector for producing a second signal;and a host computer which includes a video processing card connected to the infrared detector and the humanly visible light detector, for comparing the first signal to the second signal and for declaring a positive detection, if the first signal is large compared to the second signal.

15. The apparatus of claim 14, wherein the infrared detector and the humanly visible light detector are physically boresighted.

16. The apparatus of claim 14, further comprising means for establishing a pixel to pixel correspondence between the infrared detector and the humanly visible light detector.

17. The apparatus of claim 14, wherein the infrared detector comprises an infrared imager and the humanly visible light detector comprises a humanly visible light camera.

18. The apparatus of claim 14, wherein the host computer declares a positive detection, if the first signal is greater than three times as large as the second signal.

* * * * *